United States Patent [19]

Halloran

[11] 4,027,539
[45] June 7, 1977

[54] APPARATUS FOR, AND METHOD OF, MEASURING DYNAMIC FORCES

[76] Inventor: John D. Halloran, 208 Chasewood Lane, East Amherst, N.Y. 14051

[22] Filed: Apr. 9, 1976

[21] Appl. No.: 675,589

[52] U.S. Cl. ............................................... 73/465
[51] Int. Cl.² ......................................... G01M 1/22
[58] Field of Search ................. 73/133 R, 465, 462, 73/460

[56] References Cited

UNITED STATES PATENTS

| | | | |
|---|---|---|---|
| 2,892,152 | 6/1959 | Buisson | 73/465 X |
| 2,924,977 | 2/1960 | Kenyon et al. | 73/465 |

FOREIGN PATENTS OR APPLICATIONS

| | | | |
|---|---|---|---|
| 159,324 | 4/1962 | U.S.S.R. | 73/462 |

*Primary Examiner*—Jerry W. Myracle

*Attorney, Agent, or Firm*—Sommer & Sommer

[57] ABSTRACT

Apparatus is provided to measure the amplitude and frequency of dynamic force exerted by a rotating shaft on an adjacent non-rotating bearing. The apparatus includes two force probes operatively mounted on the bearing to sense force components in two perpendicular directions. A piezo-electric load cell in each force probe senses the frequency and a proportional amount of the amplitude of the force component in its direction, and converts such sensed frequency and amplitude into an electrical signal. The sensed amplitude in each direction is calibrated to actual amplitude. The calibrated signals from the two force probes are supplied to an oscilloscope to display a composite representation of such dynamic force in a plane including the two directions. In use, the apparatus performs a novel method of measuring such dynamic force.

8 Claims, 3 Drawing Figures

U.S. Patent
June 7, 1977
4,027,539
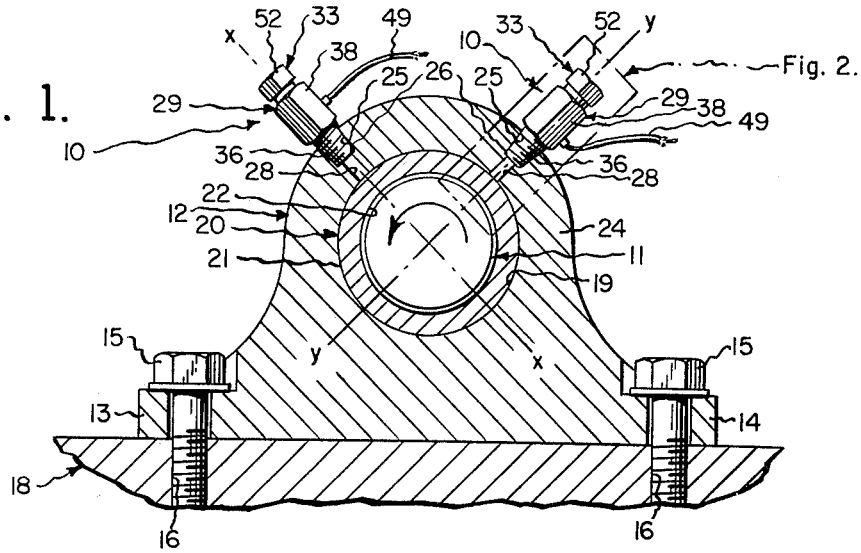
Fig. 1.
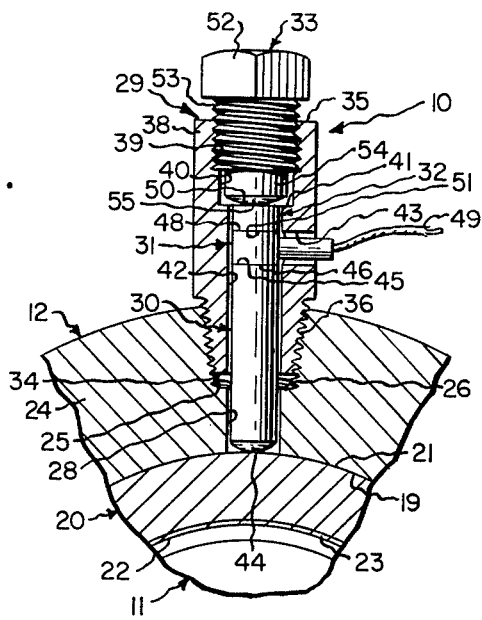
Fig. 2.
Fig. 3.
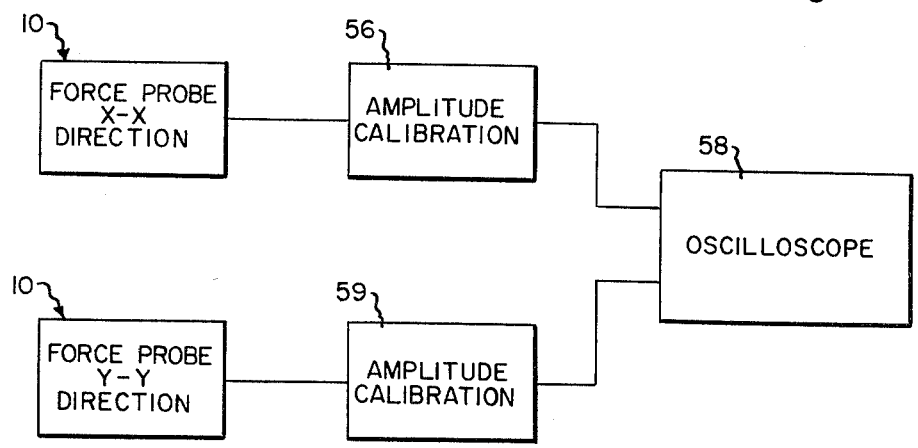

4,027,539

APPARATUS FOR, AND METHOD OF, MEASURING DYNAMIC FORCES

BACKGROUND OF THE INVENTION

1. Field of the Invention

The present invention relates generally to apparatus for, and a method of, measuring dynamic forces, and more particularly to an improved method and apparatus for measuring the dynamic force exerted by a rotating member on an adjacent non-rotating member.

2. Description of the Prior Art

For practical purposes, shafts are invariably eccentrically journaled in bearings. This condition may be attributable to several factors, such as tolerance between the shaft and the bearing, external loads and forces exerted on the shaft, and the like.

When such shafts are rotated in their bearings, this imbalance and eccentricity causes the shaft to exert a dynamic force on the bearing. Recently, with machinery being operated at higher speeds, the measure of such dynamic force has become increasingly important.

For example, such dynamic forces may be monitored to verify that the machinery is being operated within design parameters, or to obtain a measure of the fatigue or wear on such machinery over a period of time.

Such dynamic forces may be thought of as having an amplitude and a frequency. Amplitude may be significant to measure quantitatively the magnitude of imbalance, while frequency may indicate the source of imbalance to a trained eye.

SUMMARY OF THE INVENTION

The present invention provides apparatus for, and a method of, measuring the dynamic force exerted by a rotating member on an adjacent non-rotating member.

The apparatus may include a force probe having first sensing means, such as a piezo-electric load cell, mounted on the non-rotating member to sense the frequency and a proportional amount of the amplitude of a component of dynamic force at only one point in a first direction, and operative to convert such sensed frequency and amplitude into a first electrical signal; and first adjusting means, such as a potentiometer or amplifier, arranged to receive such first electrical signal and operative to produce an adjusted first electrical signal in which the sensed value of amplitude has been calibrated to its actual value; whereby the adjusted first electrical signal may represent the actual value of frequency and amplitude of the force component in the first direction. If desired, the adjusted first electrical signal may be supplied to a visual display device, such as a meter or an oscilloscope, to display such actual frequency and amplitude.

The apparatus may further include a second force probe having second sensing means, such as a piezo-electric load cell, mounted on the non-rotating member to sense frequency and a proportional amount of amplitude of another component of such dynamic force in a second direction arranged perpendicular to the first direction, and operative to convert such sensed frequency and amplitude into a second electrical signal; and second adjusting means, such as a potentiometer or amplifier, arranged to receive the second electrical signal, and operative to produce an adjusted second electrical signal in which the sensed value of amplitude has been calibrated to its actual value; whereby the adjusted first and second electrical signals may represent the actual values of frequency and amplitude of dynamic force components in the perpendicular first and second directions. If desired, such adjusted first and second electrical signals may be supplied to an oscilloscope to display a composite representation of the dynamic force in the plane including the first and second directions.

In use, the apparatus performs a novel method of measuring such force, which method comprises the following steps: sensing the frequency and a proportional amount of the amplitude of one component of dynamic force at only one point in a first direction; converging such sensed frequency and amplitude into a first electrical signal; and adjusting this first electrical signal to produce an adjusted first electrical signal in which the sensed value of amplitude has been calibrated to its actual value. If desired, the method may comprise the additional steps of: sensing the frequency and a proportional amount of the amplitude of another component of such force at only one point in a second direction arranged perpendicular to the first direction; converting such sensed frequency and amplitude in the second direction into a second electrical signal; and adjusting the second electrical signal to produce an adjusted second electrical signal in which the sensed value of amplitude has been calibrated to its actual value; thereby to produce adjusted first and second electrical signals representing the actual values of frequency and amplitude of such force components in the first and second directions. Either of these adjusted electrical signals may be supplied to a visual display device, such as a meter or an oscilloscope, to display the actual values of frequency and amplitude of the force component in the associated direction. Alternatively, both of these adjusted electrical signals may be supplied to an oscilloscope to display a composite representation of the actual values of frequency and amplitude of the dynamic force in a plane including the first and second directions.

Accordingly, one general object of the present invention is to provide apparatus for, and a method of, measuring the dynamic force exerted by a rotating member on an adjacent non-rotating member.

Another object is to provide improved apparatus for, and a novel method of, measuring the frequency and amplitude of a component of such dynamic force in one direction.

Another object is to provide improved apparatus for, and a novel method of, measuring amplitude and frequency of components of such dynamic force in each of two perpendicular directions, and displaying a composite representation of such dynamic force in the plane including the two directions.

These and other objects and advantages will become apparent from the foregoing and ongoing written specification, the drawings, and the appended claims.

BRIEF DESCRIPTION OF THE DRAWINGS

FIG. 1 is a fragmentary vertical sectional view of a shaft journalled in a pillow block, this view illustrating two force probes operatively arranged to sense the frequency and amplitude of dynamic force components in the perpendicular $x$—$x$ and $y$—$y$ directions.

FIG. 2 is a greatly enlarged fragmentary view of one of the force probes, this view showing the structure encompassed by the indicated box in FIG. 1.

FIG. 3 is a schematic view of the two force probes arranged to supply calibrated electrical signals of the force components in the $x$—$x$ and $y$—$y$ directions to an oscilloscope where such signals may be used to display a composite representation of the forces exerted by the shaft on the bearing shell in a plane including the two directions.

DESCRIPTION OF THE PREFERRED EMBODIMENTS

At the outset, it should be clearly understood that like reference numerals are intended to identify the same elements and/or structure consistently throughout the several drawing figures, as such elements and/or structure may be further described or explained by the entire written specification of which this detailed description is an integral part.

Referring now to the several drawing figures and more particularly to FIG. 1 thereof, the present invention broadly provides apparatus for, and a method of, measuring the amplitude and frequency of a dynamic force exerted by a rotating member on an adjacent non-rotating member.

In the presently preferred embodiment of the inventive apparatus generally indicated at 10, the rotating member is specifically shown as being a horizontally-elongated cylindrical shaft, generally indicated at 11, and the non-rotating member is shown as being a pillow block, generally indicated at 12. In the well known manner, pillow block 12 is provided with a pair of outwardly-extending left and right mounting flanges, 13, 14, respectively. A pair of fasteners 15, 15 may be arranged to have their head portions engage pillow block flanges 13, 14, with their threaded shank portions penetrating these flanges to matingly engage tapped holes 16, 16 provided in a suitable support, generally indicated at 18. Thus, these fasteners 15, 15 may be selectively tightened to securely mount the pillow block 12 on the support 18. In the embodiment illustrated, the pillow block 12 is shown provided with a horizontal through opening bounded by cylindrical surface 19. An annular bearing shell, generally indicated at 20, is shown as having an outer cylindrical surface 21 arranged to face pillow block cylindrical surface 19, and having an inner cylindrical surface 22. As best shown in FIG. 2, this inner surface 22 may be provided with a coating or liner of suitable material to provide a bearing surface 23 against which shaft 11 is journalled for rotation about its horizontal axis. As used herein, the term "bearing shell" is intended to refer generally to any non-rotating member which is arranged adjacent a rotating member. Thus, such a bearing shell could include a ball bearing race, and the like.

The housing 24 of pillow block 12 is illustrated as being further provided with a pair of radially extending through-bores shaving their centerlines arranged at right angles to one another. As best shown in FIG. 2, each through-bore has an internally threaded downwardly convergent frusto-conical portion 25 extending radially inwardly from the outer surface of the pillow block housing, an outwardly facing annular shoulder 26, and a cylindrical surface portion 28 continuing radially inwardly to join pillow block surface 19.

Still referring principally to FIG. 2, the force probe apparatus 10 is shown as broadly including a housing 29, a follower 30, a load cell or transducer 31, a plug 32, and an end cap 33.

In FIG. 2, the force probe housing 29 is shown as being a vertically elongated member having a lowermost horizontal annular end face 34; an uppermost horizontal annular end face 35; an outer surface including a lower downwardly convergent frusto-conical externally threaded portion 36, and an upper polygonal portion 38 adapted to be rotated by a suitable tool; and a vertical through-bore including an internally threaded upper portion 39 extending downwardly from upper end face 35, a cylindrical surface portion 40, an upwardly facing annular vertical shoulder 41, and a lower cylindrical surface portion 42 continuing downwardly from shoulder 41 to join lower end face 34. This housing 29 is shown further provided with an intermediate radially extending horizontal opening 43 which communicates through-bore lower cylindrical surface portion 40 with outer surface polygonal portion 38. As best shown in FIG. 2, each housing 29 is adapted to be threaded into one of the pillow block housing through-bores.

The follower 30 is depicted as being a vertically elongated cylindrical rod-like member slidably arranged within housing through-bore lower cylindrical portion 42. This follower is provided with a lower convex nose 44 arranged to engage the bearing shell outer surface 21, and an upper horizontal end face 45.

The load cell 31 is shown as being a piezo-electric transducer having a lower surface 46 arranged to engage follower upper end face 45, an upper surface 48, and an insulated electrical conductor 49 existing the housing through opening 43. Thus, pressure sensed by the load cell may be converted into an analog electrical signal in conductor 49. Alternatively, a strain gage-type load cell could be used.

The plug 32 may simply be a circular disc-like member arranged within housing through-bore lower cylindrical portion 42, and having upper and lower horizontal end faces 50, 51, respectively, the plug lower surface 51 being arranged to engage load cell upper surface 48.

The end cap 33 has an uppermost polygonal head portion 52 adapted to be rotated by a suitable tool, an intermediate threaded shank portion 53 arranged to matingly engage housing threaded portion 39, and a lower shank portion 54 terminating in a lowermost rounded or convex nose 55 arranged to engage and bear against plug upper surface 50.

When the various parts of the apparatus 10 are arranged as shown in FIG. 2, the end cap 33 may be further rotated to exert a compressive load on transducer 31, which load may be converted into an electrical signal and displayed on a visual display device, such as a suitable meter or an oscilloscope (not shown). If the shaft is thereafter rotated, the dynamic forces exerted by the rotating shaft on the adjacent non-rotating bearing shell in the direction including the axis of the housing through-bore, will produce fluctuations in the compressive preload exerted on the transducer 31. Of course, such fluctuations in this compressive load will produce corresponding fluctuations in the electrical signal supplied through conductor 49, which fluctuations may be monitored or displayed on the oscilloscope. The electrical signal may be used to monitor the amplitude of the fluctuations as well as their frequency, it being appreciated that amplitude will represent the quantitative amount of fluctuations of such force from the preload force, and frequency will represent the rapidity of such fluctuations.

The apparatus 10 may thus be mounted on the pillow block housing to operatively engage the bearing shell. While the apparatus 10 may be used to directly sense the frequency of such dynamic force exerted by the shaft on the pillow block, persons skilled in this art will readily appreciate that the sensed value of amplitude of the component of such dynamic force in such direction may be opposed by another component of such force in this direction. While such amplitude sensed at only one point in the direction will not represent the entire force exerted by the shaft on the bearing shell, such sensed amplitude at this one point will represent a proportional amount of the total force in this direction. Therefore, the sensed value of amplitude may be calibrated by a known technique, such that the adjusted or calibrated amplitude will represent net force in this direction.

Referring now to FIGS. 1 and 3, two embodiments of the apparatus 10 may be operatively arranged at 90° interval to sense force components in each of two perpendicular directions. Thereafter, their electrical signals may be separately adjusted to calibrate the sensed values of amplitude to their actual values in the associated directions and such adjusted electrical signals may be operatively supplied to an oscilloscope to display a composite representation of the dynamic force exerted by the shaft on the bearing surface in the plane including the two perpendicular directions.

To this end, the left force probe 10 is operatively arranged to sense frequency and a proportional amount of amplitude of the dynamic force component in the $x-x$ direction, and the right force probe 10 is operatively arranged to sense frequency and a proportional amount of amplitude of the dynamic force component in the $y-y$ direction. These directions $x-x$ and $y-y$ are perpendicular to one another, and are perpendicular to the longitudinal axis of the shaft.

Adverting now to FIG. 3, the electrical signal generated by left force probe 10 in the $x-x$ direction, representing actual frequency but only a proportional amount of amplitude in this direction, may be supplied to a potentiometer or amplifier 56 to calibrate or adjust the sensed value of amplitude to its actual value, after which this adjusted or calibrated electrical signal may be supplied as an input to an oscilloscope 58 or other suitable device. Similarly, the electrical signal generated by right force probe 10 in the $y-y$ direction, representing actual frequency but only a proportional amount of amplitude in this direction, may be supplied to a potentiometer or amplifier 59 to calibrate or adjust the sensed value of amplitude to its actual value, after which this adjusted or calibrated electrical signal may also be supplied as a separate input to oscilloscope 58. Receiving such input electrical signals from the mutually perpendicular $x-x$ and $y-y$ directions in a common plane, the oscilloscope may display a composite picture or representation of the total dynamic force exerted by the shaft on the bearing shell in this plane. In accordance with well known techniques, this displayed composite representation may indicate both amplitude and frequency of the dynamic force.

In this manner, the present invention broadly provides apparatus 10 for measuring the amplitude and frequency of a dynamic force exerted by a rotating member, such as shaft 11, on an adjacent non-rotating member, such as pillow block 12. The apparatus 10 includes first sensing means, such as left load cell 31, mounted on the non-rotating member to sense the frequency and a proportional amount of the amplitude of a component of such force at only one point in the first $x-x$ direction, and operative to convert such sensed frequency and amplitude in this first direction into a first electrical signal; and adjusting means, such as potentiometer or amplifier 56, operatively arranged to receive the first electrical signal and operative to produce an adjusted first electrical signal in which the sensed value of amplitude has been calibrated to its actual value; whereby this adjusted first electrical signal may represent the actual value of frequency and amplitude of a component of such force in the first direction.

This adjusted first electrical signal may be supplied to oscilloscope 58 to display the actual frequency and amplitude of the component of such force in the first direction.

The apparatus may further include second sensing means, such as the load cell 31 of right force probe 10, mounted on the non-rotating member to sense the frequency and a proportional amount of the amplitude of another component of such dynamic force at only one point in the second $y-y$ direction arranged perpendicular to the first $x-x$ direction, and operative to convert such sensed frequency and amplitude in direction $y-y$ into a second electrical signal; and second adjusting means, such as potentiometer or amplifier 59, arranged to receive this second electrical signal and operative to produce an adjusted second electrical signal in which the sensed value of such amplitude has been calibrated to its actual value; whereby the adjusted first and second electrical signals may represent the actual values of frequency and amplitude of components of such dynamic force in the first and second directions.

These adjusted first and second electrical signals may then be supplied to an oscilloscope to display a composite picture or representation of the dynamic force in a plane including the first and second directions.

The inventive apparatus may be used to practice a method of measuring the amplitude and frequency of a component of a dynamic force exerted by a rotating member on an adjacent non-rotating member. This method includes the steps of: sensing the frequency and a proportional amount of the amplitude of a component of such force at only one point in a first direction; converting such sensed frequency and amplitude into a first electrical signal; and adjusting the first electrical signal to calibrate the sensed value of amplitude to its actual value; thereby to produce an adjusted first electrical signal representing the actual values of frequency and amplitude of such force component in this first direction.

This method may include the additional steps of: supplying the adjusted first electrical signal to an oscilloscope, and displaying the actual values of frequency and amplitude of the force component in the first direction.

Alternatively, the method may include the additional steps of: sensing the frequency and a proportional amount of the amplitude of another component of such force at only one point in a second direction arranged perpendicular to the first direction; converting the sensed frequency and amplitude in the second direction into a second electrical signal; and adjusting the second electrical signal to calibrate the sensed value of amplitude to its actual value; thereby to produce adjusted first and second electrical signals representing the actual values of frequency and amplitude of components of such force in the first and second directions.

This alternative method may include the additional steps of: supplying the adjusted first and second electrical signals to an oscilloscope; and displaying a composite representation of the actual values of frequency and amplitude of the dynamic force in a plane including the first and second directions.

Moreover, it will be noted that the load cells are positioned as close as possible to the bearing shell, where the forces are applied, to reduce the effective mass of the non-rotating member, and to widen the band of usable frequency response.

Therefore, while the disclosed embodiments constitute presently preferred forms of the present invention, persons skilled in this art will readily appreciate that various changes and modifications may be made without departing from the spirit of the invention which is generally defined by the following claims:

What is claimed is:

1. The method of measuring the amplitude and frequency of a component of dynamic force exerted by a rotating member on an adjacent bearing shell in a first direction, said bearing shell being mounted within a non-rotating member, comprising the following steps:
sensing between said bearing shell and non-rotating member the frequency and a proportional amount of the amplitude of such force component exerted by said rotating member on said bearing shell at only one point in said first direction;
converting such sensed frequency and amplitude in said first direction into a first electrical signal; and
adjusting said first electrical signal to calibrate the sensed value of amplitude to its actual value;
thereby to produce an adjusted first electrical signal representing the actual values of frequency and amplitude of said force component in said first direction.

2. The method as set forth in claim 1, comprising the following additional steps:
supplying said adjusted first electrical signal to a visual display device; and
displaying said actual values of frequency and amplitude said force component in said first direction.

3. The method as set forth in claim 1, comprising the following additional steps:
sensing between said bearing shell and non-rotating member the frequency and a proportional amount of the amplitude of another component of force exerted by said rotating member on said bearing shell at only one point in a second direction arranged perpendicular to said first direction;
converting such sensed frequency and amplitude in said second direction into a second electrical signal; and
adjusting said second electrical signal to calibrate the sensed value of amplitude to its actual value.
thereby to produce adjusted first and second electrical signals representing the actual values of frequency and amplitude of said force components in said first and second directions.

4. The method as set forth in claim 3, comprising the following additional steps:
supplying said adjusted first and second electrical signals to an oscilloscope; and
displaying a composite representation of the actual values of frequency and amplitude of said dynamic force in a plane including said first and second directions.

5. Apparatus for measuring the amplitude and frequency of a component of dynamic force exerted by a rotating member on an adjacent bearing shell in a first direction, said bearing shell being operatively mounted in a non-rotating member, comprising:
first sensing means arranged to penetrate said non-rotating member to physically contact said bearing shell, said first sensing means being adapted to sense the frequency and a proportional amount of the amplitude of such force component at only one point in a first direction and operative to convert such sensed frequency and amplitude in said first direction into a first electrical signal; and
first adjusting means arranged to receive said first electrical signal and operative to produce an adjusted first electrical signal in which the sensed value of such amplitude has been calibrated to its actual value;
whereby said adjusted first electrical signal may represent the actual value of frequency and amplitude of said force component in said first direction.

6. The apparatus as set forth in claim 5 and further comprising:
a visual display device operatively arranged to receive said adjusted first electrical signal and to display the actual frequency and amplitude of said force component in said first direction.

7. The apparatus as set forth in claim 5, and further comprising:
second sensing means arranged to penetrate said non-rotating member to physically contact said bearing shell at only one point in a second direction arranged perpendicular to said first direction, said second sensing means being adapted to sense the frequency and a proportional amount of the amplitude of another component of said dynamic force at only one point in said second direction and operative to convert such sensed frequency and amplitude in said second direction into a second electrical signal; and
second adjusting means arranged to receive said second electrical signal, and operative to produce an adjusted second electrical signal in which the sensed value of such amplitude has been calibrated to its actual value;
whereby said adjusted first and second electrical signals may represent the actual values of frequency and amplitude of said force components in said first and second directions.

8. The apparatus as set forth in claim 7, and further comprising:
an oscillocope operatively arranged to receive said adjusted first and second electrical signals, and operative to display a composite representation of said dynamic force in a plane including said first and second directions.

* * * * *